(12) United States Patent
Chang et al.

(10) Patent No.: US 6,896,373 B2
(45) Date of Patent: May 24, 2005

(54) OPTICAL SYSTEM FOR PROJECTION DISPLAY AND A PROJECTION METHOD THEREOF

(75) Inventors: Sean Chang, Taoyuan (TW); Sean Huang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 10/823,045

(22) Filed: Apr. 13, 2004

(65) Prior Publication Data

US 2005/0018146 A1 Jan. 27, 2005

(30) Foreign Application Priority Data

Jul. 24, 2003 (TW) ........................................ 92120244 A

(51) Int. Cl.$^7$ ........................ G03B 21/00; G03B 21/28; G02F 1/00; H04N 5/74; G02B 5/04
(52) U.S. Cl. ............................ 353/33; 353/81; 353/99; 348/771; 359/834
(58) Field of Search ............................... 353/31, 33, 34, 353/37, 81, 82, 88, 89, 98, 99; 348/771; 359/831, 833, 834

(56) References Cited

U.S. PATENT DOCUMENTS

| | | | |
|---|---|---|---|
| 6,454,417 B1 * | 9/2002 | Takamoto et al. | 353/33 |
| 6,560,048 B1 * | 5/2003 | Okamori et al. | 359/833 |
| 6,583,940 B2 * | 6/2003 | Nishikawa et al. | 359/738 |
| 2003/0142278 A1 * | 7/2003 | Yamamoto | 353/31 |

* cited by examiner

*Primary Examiner*—Judy Nguyen
*Assistant Examiner*—Melissa J Koval
(74) *Attorney, Agent, or Firm*—Chao-Chang David Pai; Law Offices of David Pai

(57) ABSTRACT

An optical system for enhancing the image contrast and shortening the back focal length of a projection display is disclosed, which includes a light source, a light path switching device, and a total internal reflection (TIR) prism set disposed between the light path switching device and the projection lens. The light path switching device has a first mode of operation for directing the light towards a projection lens and a second mode of operation for directing the light away from the projection lens. The TIR prism set includes a first prism, a second prism and a third prism; a first gap is formed between the first prism and the second prism, and a second gap is formed between the first prism and the third prism.

20 Claims, 5 Drawing Sheets

OPTICAL SYSTEM FOR PROJECTION DISPLAY AND A PROJECTION METHOD THEREOF

BACKGROUND OF THE INVENTION a. Field of the Invention

The invention relates to an optical system for a projection display and, more particularly, to an optical system for a projection display capable of providing high image contrast and a wide viewing angle.

b. Description of the Related Art

A projection display typically consists of an illumination system and a projection system. The illumination system incorporates a light path switching device that consists of a plurality of relatively small elements each being used to switch light path individually. After being modulated by the switching elements, light beams emitted from a light source are projected on a projection surface through the projection system.

A digital micromirror device (DMD) manufactured by Texas Instruments (TI), as an example of a light path switching device, is composed of thousands of micromirrors. The DMD panel's micromirrors are mounted on tiny hinges that enable them to tilt either toward the light source (ON mode) or away from it (OFF mode), thus creating a light or dark pixel on the projection surface.

FIG. 1 is a schematic view showing a conventional optical system 100 for a projection display. Referring to FIG. 1, the tiltable micromirrors on a digital micromirror device 102 may either direct the incoming light l onto a projection lens 104 along path 108 under the "On mode" or direct it away from the projection lens 104 along path 110 under the "Off mode", thereby creating a light or dark pixel on the projection surface.

A total internal reflection (TIR) prism set 106, composed of two prisms 106a and 106b adhered to each other with an air gap 112 interposed therebetween, is disposed in a light path between the digital micromirror device 102 and the projection lens 104. The TIR prism set 106, inside which total internal reflection occurs at the boundary between the prism 106b and the air gap 112, guides the incoming light l to the digital micromirror device 102 along the light path shown in FIG. 1.

However, through such design, since the tilting range of the micromirror is limited, the light path of the incoming light l between the digital micromirror device 102 and the projection lens 104 under the On mode is almost the same as that under the Off mode; hence, an edge portion of the spread-out incoming light l enters the projection lens 104 under the Off mode to result in a deterioration in the image contrast. Though this problem may be solved by increasing the distance between the projection lens 104 and the TIR prism set 106 to prevent stray light from entering the projection lens under the Off mode, the back focal length, however, is increased accordingly, and thus it is difficult to design a projection lens with a wide viewing angle.

FIGS. 2A and 2B are schematic views showing another optical system 200 for a projection display. The TIR prism set 206 of the optical system 200 includes three prisms, and air gaps 208 and 210 are formed between each two adjacent prisms. Under the On mode as shown in FIG. 2A, the incoming light l enters the digital micromirror device 202 due to the total internal reflection occurring at the boundary between the air gap 208 and the prism. Then, the light l reflected by the micromirror on the digital micromirror device 202 passes through the TIR prism set 206 and enters a projection lens 204 along a non-reflected optical axis. On the other hand, as shown in FIG. 2B, under the Off mode the light reflected by the micromirror on the digital micromirror device 202 is reflected outside the optical system 200 due to the total internal reflection occurring at the boundary between the air gap 210 and the prism. Such TIR prism set 206 may render the light paths under the On mode and the Off mode more distinguishable to prevent stray light from entering the projection lens. However, the width W along the non-reflected optical axis of the assembled TIR prism set 206 becomes larger and the back focal length is increased, thus it is also difficult to design a projection lens with a wide viewing angle.

BRIEF SUMMARY OF THE INVENTION

An object of the invention is to provide an optical system for a projection display capable of eliminating the stray light to enhance the image contrast and shortening the back focal length to provide a projection display with a wide viewing angle.

According to the invention, the optical system includes a light source, a light path switching device, and a total internal reflection (TIR) prism set disposed between the light path switching device and the projection lens. The light path switching device has a first mode of operation for directing the light towards a projection lens and a second mode of operation for directing the light away from the projection lens. The TIR prism set includes a first prism, a second prism and a third prism; a first gap is formed between the first prism and the second prism, and a second gap is formed between the first prism and the third prism. The light emitted from the light source enters the light path switching device by means of total internal reflection. Then, under the first mode, the light reflected by the light path switching device passes through the first and the second gaps and enters the projection lens, whereas under the second mode, the light reflected by the light path switching device is totally reflected at the boundary between the first gap and the second prism and away from the projection lens.

Through the design of the invention, the light reflected by the light path switching device under the "Off" mode is totally reflected at the boundary between the air gap and the prism that the light reflected by the light path switching device first meets when entering the TIR prism set. Thus, since the incoming light l that is to be removed under the "Off" mode is quickly and completely directed away from the projection lens, the overall thickness along the non-reflected optical axis of the assembled TIR prism set can be greatly reduced, and the back focal length is decreased as a result. Consequently, a wide viewing angle for the projection lens can be achieved easily.

Also, according to the invention, the TIR prism set can be shaped to provide the total internal reflection for restricting the light path through which the light reflected by the micromirror array travels under the Off mode. Hence, it can be further ensured that the stray light no longer enters the projection lens under the Off mode.

BRIEF DESCRIPTION OF THE DRAWINGS

FIG. 4A shows the light path under the On mode while FIG. 4B shows that under the Off mode.

DETAILED DESCRIPTION OF THE INVENTION

Figure 1:
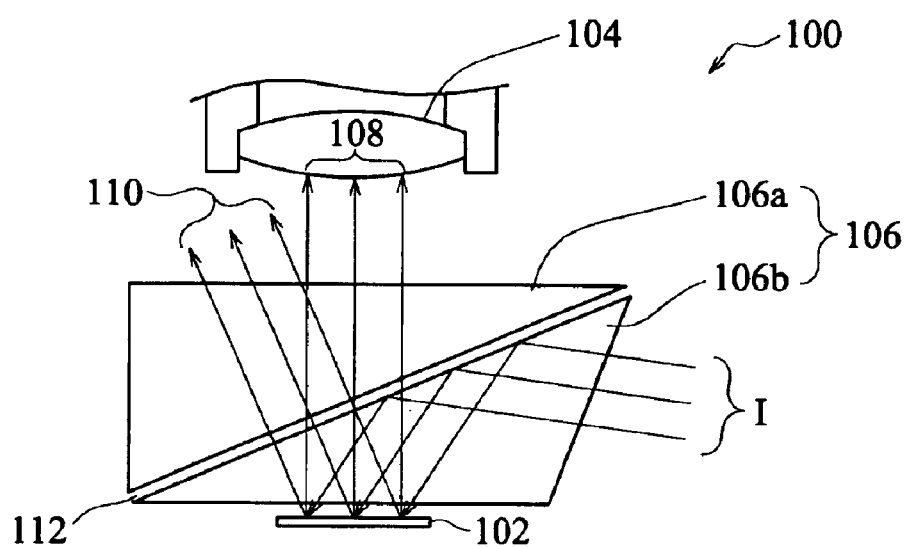
FIG. 1 is a schematic view showing a conventional optical system for a projection display
Figure 2A:
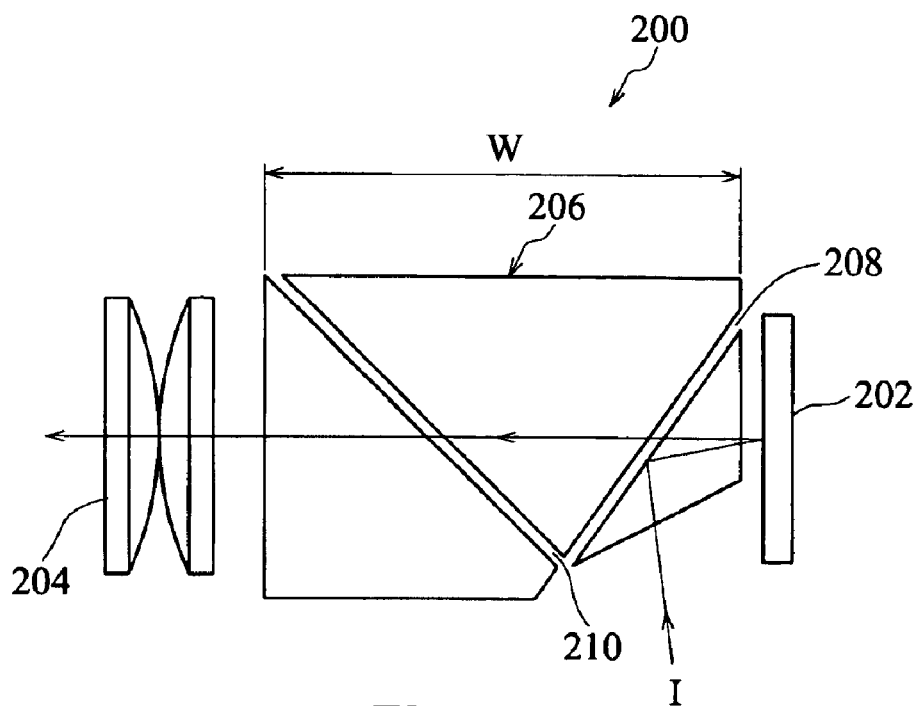
FIGS. 2A and 2B are schematic views showing another optical system for a projection display.
Figure 2B:
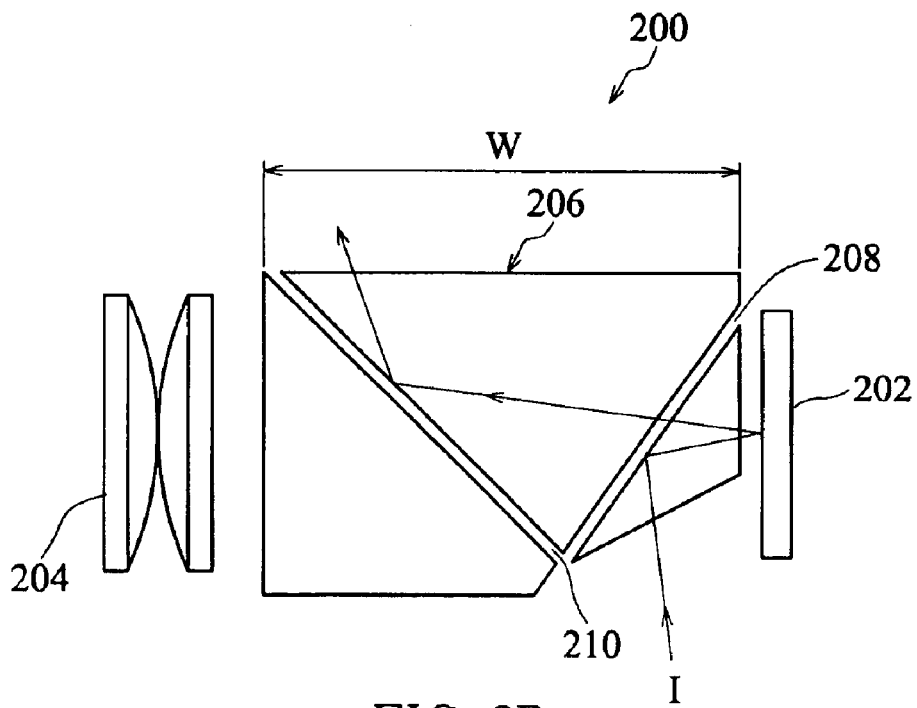
Figure 3:
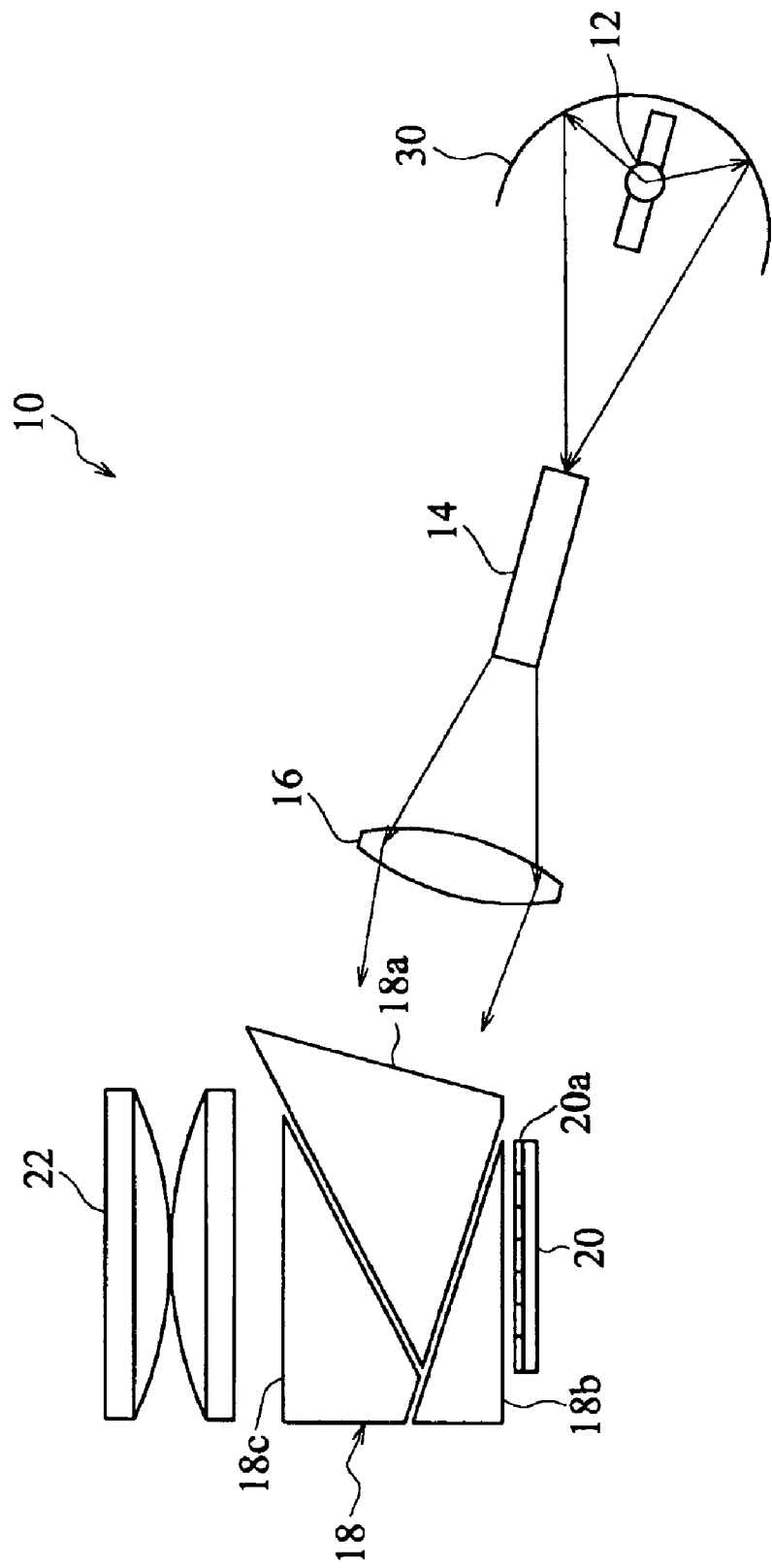
FIG. 3 is a schematic view showing an optical system for a projection display according to an embodiment of the invention.

Referring to FIG. 3, an optical system 10 for a projection display includes a light source 12, a light guide 14, a relay lens 16, a total internal reflection (TIR) prism set 18, a light path switching device 20, and a projection lens 22. A light collector such as an ellipsoid mirror 30 may be arranged to partially surround the light source 12 to focus the light beams, emitted from the light source 12, onto the light guide 14. The light guide 14, which is hollow with interior reflecting walls where total internal reflections successively occur, receives the light beams from the light source 12 and outputs them as evenly distributed light beams. The evenly distributed light beams are then projected on the TIR prism set 18 after passing through the relay lens 16.

A micromirror array 20a consists of a plurality of tiltable micromirrors is disposed on the light path switching device 20. The tiltable micromirrors may either direct the incoming light onto a projection lens 22 under the "On mode" or direct it away from the projection lens 22 under the "Off mode", thereby creating a light or dark pixel on a projection surface. It should be noted that the modes of operation of the tiltable micromirrors include, but are not limited to, the aforesaid "On mode" and "Off mode", and can be adapted to the actual demand of the light modulation.

Figure 4A:
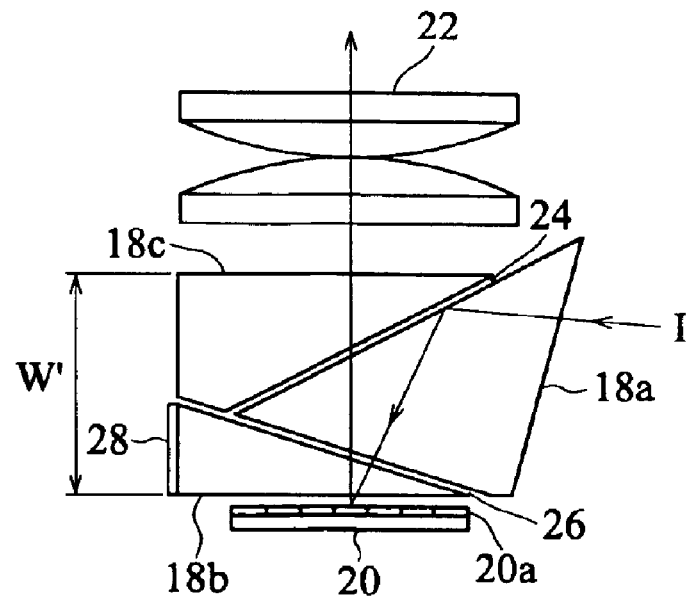
FIGS. 4A and 4B exhibit the light paths through which the incoming light 1 travels after entering the TIR prism set according to an embodiment of the invention, where
Figure 4B:
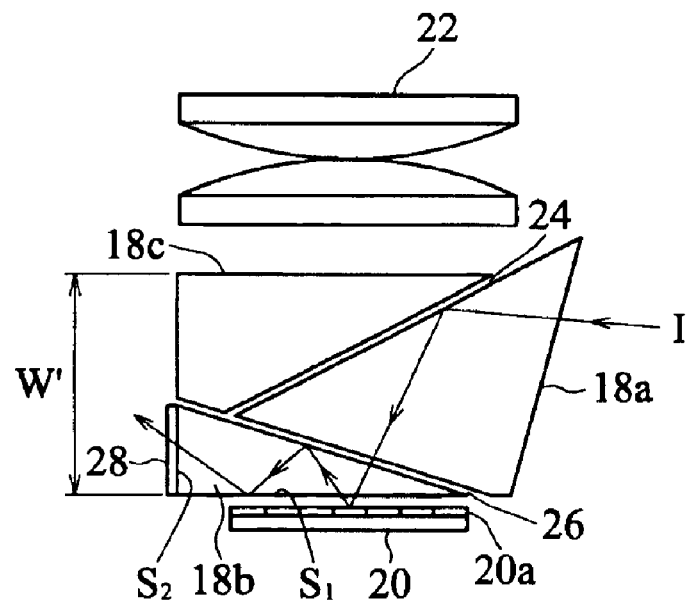

FIGS. 4A and 4B exhibit the light paths through which the incoming light 1 travels after entering the TIR prism set 18 according to an embodiment of the invention, where FIG. 4A shows the light path under the On mode while FIG. 4B shows that under the Off mode. In this embodiment, the TIR prism set 18 is composed of a prism 18a adjacent to the light guide 14, a prism 18b adjacent to the light path switching device 20, and a prism 18c adjacent to the projection lens 22. An air gap 24 is formed between the prism 18a and the prism 18c, and another air gap 26 is formed between the prisms 18a and 18b.

The incoming light 1 first strikes the boundary between the prism 18a and the air gap 24 at a predetermined incident angle, which is greater than the critical angle calculated from the Snell's law, so that the incoming light 1 is totally reflected to the light path switching device 20.

Referring to FIG. 4A, when micromirror array 20a is tilted under the On mode, the light reflected by the micromirror array 20a sequentially passes through the air gap 26 and air gap 24 along a non-reflected optical axis and then enters the projection lens 22. On the other hand, as shown in FIG. 4B, under the Off mode the light reflected by the micromirror array 20a strikes the boundary between the prism 18b and the air gap 26 at an incident angle, which is also designed to be greater than the critical angle calculated from the Snell's law.

Hence, through the design of the invention, the incoming light 1 that is to be removed under the Off mode is quickly and completely directed away from the projection lens 22, for it is totally reflected at the boundary between the prism 18b and the air gap 26. In other words, the light reflected by the micromirror array 20a under the Off mode is further totally reflected at the boundary between the air gap 26 and the prism 18b, and the prism 18b is the prism that the light reflected by the micromirror array 20a first meets when entering the TIR prism set 18.

Further, the TIR prism set 18 of the invention is designed such that the light reflected at the boundary between the prism 18b and the air gap 26 is totally reflected again on the surface $S_1$ of the prism 18b closest to the micromirror array 20a.

In addition, the prism 18b can be shaped such that the light reflected by the surface $S_1$ may further strike the prism surface opposed to the surface $S_1$ at an incident angle greater than the critical angle. Therefore, the traveling path of the incoming light 1 under the Off mode is restricted within the prism 18b as shown in FIG. 4B, and, finally, the light leaves the optical system via the side surface $S_2$ of the prism 18b to further ensure that the stray light no longer enters the projection lens 22 under the Off mode.

Furthermore, since the light under the Off mode leaves the optical system via the side surface $S_2$ of the prism 18b, a light-absorbing substance may be applied to the side surface $S_2$ so as to absorb the light. For example, a light absorbing layer 28 may be coated on the side surface $S_2$ of the prism 18b.

Through the TIR prism set design of the invention, the light reflected by the micromirror array 20a under the "Off" mode is totally reflected at the boundary between the air gap and the prism that the light reflected by the micromirror array 20a first meets when entering the TIR prism set. Thus, since the incoming light 1 that is to be removed under the "Off" mode is quickly and completely directed away from the projection lens 22, the overall thickness along the non-reflected optical axis of the assembled TIR prism set can be greatly reduced, and the back focal length is decreased as a result. This makes it easy to design a projection lens having a wide viewing angle.

Also, according to the invention, the TIR prism set can be shaped to provide the total internal reflection for restricting the light path through which the light reflected by the micromirror array travels under the Off mode. As a result, it can be further ensured that the stray light no longer enters the projection lens under the Off mode.

Figure 5:
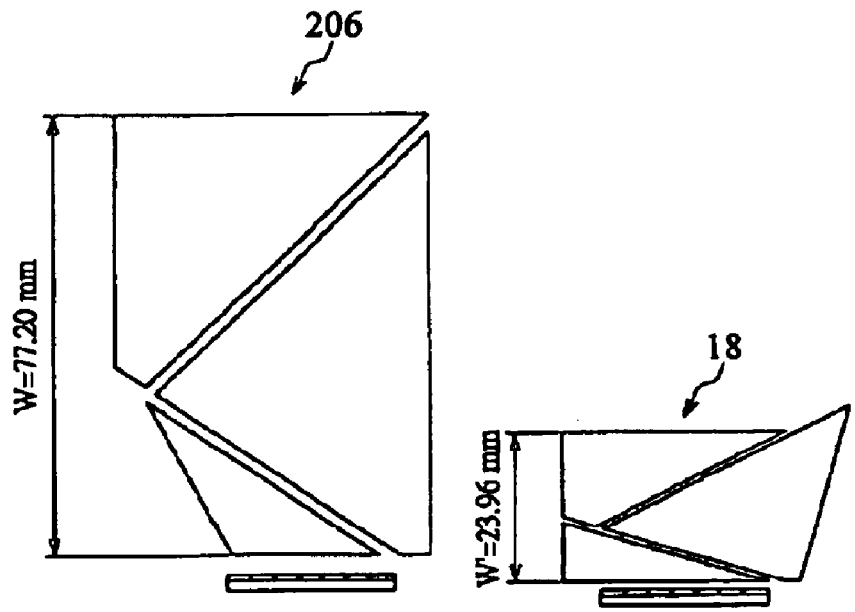
FIG. 5 shows an actual dimension of an assembled TIR prism set of the invention compared to that of the prior art.

FIG. 5 shows the actual dimension along the non-reflected optical axis of an assembled TIR prism set of the invention (on the right) compared to the prior art (on the left). It should be noted that the dimension shown in the figure are determined under the same conditions for providing total internal reflection; for instance, the material of the TIR prism set and the adopted micromirror array are the same. As for the width W along the non-reflected optical axis of the assembled TIR prism set, the conventional three-piece TIR prism set 206 has a thickness W equal to 77.2 mm while the TIR prism set 18 of the invention has a thickness W' equal to only 23.96 mm.

Figure 6:
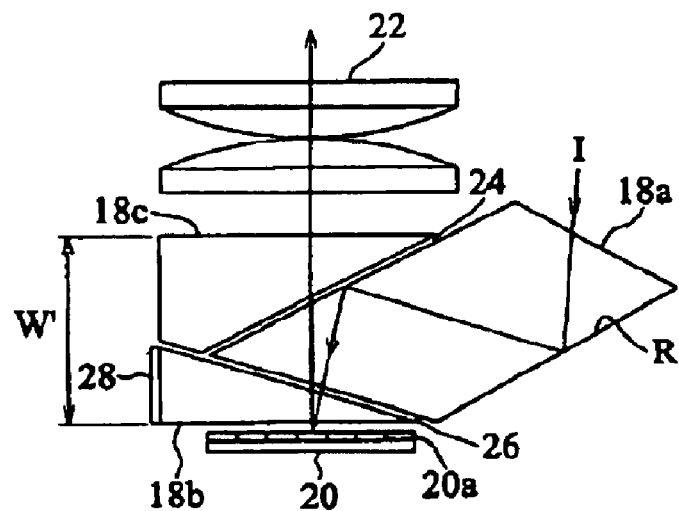
FIG. 6 is a schematic view showing a modification of the TIR prism set according to another embodiment of the invention.

FIG. 6 is a schematic view showing a modification of the TIR prism set 18 according to another embodiment of the invention. According to the invention, the TIR prism set design is required only to maintain an air gap between adjacent prisms to provide the total internal reflection, and the shape or arrangement of the prisms can be adapted to conform to the actual light path.

For instance, if the light path of the optical system needs to be shortened, the conventional method is to dispose an additional reflection mirror to change the light path of the incoming light 1. However, in this embodiment, the shape of the prism 18a may be modified so that it becomes a quadrangular prism where an additional reflection surface R is provided, as shown in FIG. 6. Thereby, the incoming light 1 is first reflected by the reflection surface R and then incident at the boundary between the prism 18a and the air gap 24, where the total internal reflection occurs. Hence, the light path in the optical system can be changed without the need of any additional element such as a reflection mirror, and thus it is possible to reduce the manufacturing cost and facilitate the assembly.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. An optical system for a projection display, comprising:
    a light source for producing light;
    a light path switching device having a plurality of modes of operation for receiving and reflecting the light, the plurality of modes comprising at least a first mode for directing the light towards a projection lens of the projection display and a second mode for directing the light away from the projection lens; and
    a total internal reflection (TIR) prism set disposed between the light path switching device and the projection lens and comprising a first prism, a second prism and a third prism, a first gap being formed between the first prism and the second prism and a second gap being formed between the first prism and the third prism;
    wherein the light enters the light path switching device by total internal reflection; under the first mode, the light reflected by the light path switching device passes through the first and the second gaps and enters the projection lens; and under the second mode, the light reflected by the light path switching device is totally reflected at the boundary of the second prism near the first gap so that the light reflected by the light path switching device is prevented from reentering the first gap.

2. The optical system according to claim 1, wherein the light that is totally reflected at the boundary of the second prism near the first gap under the second mode is further reflected on the surface of the second prism closest to the light path switching device under the second mode.

3. The optical system according to claim 2, wherein the light leaves the optical system via a side surface of the second prism under the second mode, and a light-absorbing substance is applied on the side surface.

4. The optical system according to claim 3, wherein the light-absorbing substance is a light-absorbing layer coated on the side surface.

5. The optical system according to claim 1, wherein the light path switching device is a micromirror array that consists of a plurality of micromirrors each receiving and reflecting the light.

6. The optical system according to claim 1, further comprising a light guide disposed between the light source and the TIR prism set.

7. The optical system according to claim 6, further comprising a relay lens disposed between the light guide and the TIR prism set.

8. The optical system according to claim 1, wherein the light enters the optical system via the first prism; and the light leaves the optical system via the third prism under the first mode whereas it leaves the optical system via the second prism under the second mode.

9. A projection method for an optical system for a projection display comprising the steps of:
    guiding the light emitted from a light source onto a light path switching device having a first mode and a second mode of operation;
    disposing a TIR prism set between the light path switching device and a projection lens of the projection display, the TIR prism set comprising a first prism, a second prism, and a first gap formed between the first prism and the second prism, said prisms and first gap being arranged such that the light emitted from the light source is totally reflected to the light path switching device at an internal boundary of the first prism; and
    switching the light path switching device to direct the light reflected by the light path switching device onto a projection lens under the first mode end to direct it away from the projection lens under the second mode, a total internal reflection occurring at the boundary of the second prism near the first gap so that the light reflected by the light path switching device is prevented from reentering the first gap under the second mode.

10. The projection method according to claim 9, wherein the light reflected by the light path switching device and totally reflected at the boundary of the second prism near the first gap is further totally reflected on the surface of the second prism closest to the light path switching device under the second mode.

11. The projection method according to claim 9, wherein under the second mode the light leaves the optical system via a side surface of the prism that the light reflected by the light path switching device first meets, and a light-absorbing substance is applied on the side surface.

12. The projection method according to claim 9 wherein the light path switching device is a micromirror array that consists of a plurality of micromirrors each receiving and reflecting the light.

13. An optical system for a projection display, comprising:
    a light source for producing light;
    a light path switching device having a plurality of modes of operation for receiving and reflecting the light, the plurality of modes comprising at least a first mode for directing the light towards a projection lens of the projection display and a second mode for directing the light away from the projection lens; and
    a total internal reflection (TIR) prism set disposed between the light path switching device and the projection lens and comprising a first prism, a second prism and a third prism, a first gap being formed between the first prism and the second prism and a second gap being formed between the first prism and the third prism;
    wherein the light enters the light path switching device by total internal reflection; under the first mode, the light reflected by the light path switching device passes through the first and the second gaps and enters the projection lens; under the second mode, the light reflected by the light path switching device is totally reflected at the boundary of the second prism near the first gap, is further reflected on the surface of the second prism closest to the light path switching device, and then leaves the optical system via a side surface of the second prism; and a light-absorbing substance is applied on the side surface.

14. The optical system according to claim 13, wherein the light-absorbing substance is a light-absorbing layer coated on the side surface.

15. The optical system according to claim 13, wherein the light path switching device is a micromirror array that consists of a plurality of micromirrors each receiving and reflecting the light.

16. The optical system according to claim 13, further comprising a light guide disposed between the light source and the TIR prism set.

17. The optical system according to claim 16, further comprising a relay lens disposed between the light guide and the TIR prism set.

18. The optical system according to claim 13, wherein the light enters the optical system via the first prism; and the light leaves the optical system via the third prism under the first mode.

19. A projection method for an optical system for a projection display comprising the steps of:

guiding the light emitted from a light source onto a light path switching device having a first mode and a second mode of operation;

disposing a TIR prism set between the light path switching device and a projection lens of the projection display, the TIR prism set comprising a first prism, a second prism and a first gap formed between the first prism and the second prism, said prisms and first gap being arranged such that the light emitted from the light source is totally reflected to the light path switching device at an internal boundary of the first prism; and switching the light path switching device to direct the light reflected by the light path switching device onto a projection lens under the first mode and to direct it away from the projection lens under the second mode, wherein a total internal reflection occurs at the boundary of the second prism near the first gap so that the light reflected by the light path switching device is prevented from reentering the first gap under the second mode, but is further reflected on the surface of the second prism closest to the light path switching device, and then leaves the optical system via a side surface of the second prism; and a light-absorbing substance is applied on the side surface.

20. The projection method according to claim 19 wherein the light path switching device is a micromirror array that consists of a plurality of micromirrors each receiving and reflecting the light.

* * * * *